United States Patent
Martinez Garrido et al.

(10) Patent No.: US 11,597,101 B2
(45) Date of Patent: Mar. 7, 2023

(54) 3D-ARCHITECTED SOFT MACHINES WITH TOPOLOGICALLY ENCODED ACTUATION

(71) Applicant: Purdue Research Foundation, West Lafayette, IN (US)

(72) Inventors: Ramses Valentin Martinez Garrido, West Lafayette, IN (US); Debkalpa Goswami, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 371 days.

(21) Appl. No.: 16/706,248

(22) Filed: Dec. 6, 2019

(65) Prior Publication Data

US 2020/0189124 A1    Jun. 18, 2020

Related U.S. Application Data

(60) Provisional application No. 62/780,400, filed on Dec. 17, 2018.

(51) Int. Cl.
*B25J 15/12*    (2006.01)
*B62D 57/032*    (2006.01)

(52) U.S. Cl.
CPC ............ *B25J 15/12* (2013.01); *B62D 57/032* (2013.01)

(58) Field of Classification Search
CPC .......... B25J 15/12; B25J 9/104; B25J 9/0012; B62D 57/032
See application file for complete search history.

(56) References Cited

U.S. PATENT DOCUMENTS

| | | | | |
|---|---|---|---|---|
| 9,464,642 | B2 * | 10/2016 | Ilievski | B25J 11/00 |
| 2016/0361821 | A1 * | 12/2016 | Lessing | B25J 15/0061 |
| 2016/0375590 | A1 * | 12/2016 | Lessing | B25J 15/12 294/196 |
| 2017/0028566 | A1 * | 2/2017 | Knopf | B25J 15/12 |
| 2017/0291806 | A1 * | 10/2017 | Lessing | B25J 9/1612 |

FOREIGN PATENT DOCUMENTS

WO     WO-2015102723 A2 *    7/2015    .............. B25J 18/06

OTHER PUBLICATIONS

Martines J., et al., Polyhedral Voronoi Diagrams for additive manufacturing. ACM Trans. Graph., vol. 37, No. 4, Article 129, Aug. 2018.

* cited by examiner

*Primary Examiner* — Stephen A Vu
(74) *Attorney, Agent, or Firm* — Purdue Research Foundation

(57) ABSTRACT

The present disclosure generally relates to 3D-architected soft machines with topologically encoded actuation, and methods of making and using the 3D-architected soft machines.

15 Claims, 7 Drawing Sheets

3D-ARCHITECTED SOFT MACHINES WITH TOPOLOGICALLY ENCODED ACTUATION

CROSS-REFERENCE TO RELATED APPLICATION

The present application claims the priority benefit of U.S. Provisional Patent Application Ser. No. 62/780,400, filed Dec. 17, 2018, the contents of which are hereby incorporated by reference in their entirety into this disclosure.

TECHNICAL FIELD

The present disclosure generally relates to 3D-architected soft machines with topologically encoded actuation, and methods of making and using the 3D-architected soft machines.

BACKGROUND

This section introduces aspects that may help facilitate a better understanding of the disclosure. Accordingly, these statements are to be read in this light and are not to be understood as admissions about what is or is not prior art.

Soft machines with continuously deformable bodies are advantageous for safe physical human-robot interactions and the manipulation of delicate objects, as well as for withstanding large impact forces and achieving multiple locomotion gaits (such as crawling, undulation, hopping, rolling, or growing) to adapt to their environment. Despite their advantages in safety, adaptability, and maneuverability, soft robots suffer from the lack of rigorous engineering methods since traditional rigid-body mechanics cannot adequately describe continuum soft robotic motion. Heuristic and intuition-driven approaches typically used in the design and fabrication of soft robots are further strained in the case of multifunctional soft robotic systems, which have only been able to demonstrate re-configurability via the removal and re-addition of parts relative to each other.

The architecture of a material determines its mechanical properties and performance. Mechanical metamaterials illustrate this close relationship between architecture and functionality by exhibiting unusual physical properties such as negative Poisson's ratio, multistability, phase shifting, or programmability. The structure of most mechanical metamaterials previously reported consist of periodic arrays of unit cells, which lead to materials with uniform mechanical responses upon actuation. Latest advances in soft robotics, wearable devices, and prosthetics, however, require spatially distributed functionality, which can only be produced by complex aperiodic architectures that are difficult to design. Naïve implementations of complex aperiodic structures often lead to geometrical frustration zones (areas of the material where local constraints cannot be satisfied), which impede the coherent operation of the material and prevent metamaterial-like functionality. The lack of rational design algorithms capable of rapidly creating aperiodic, yet frustration free, architected materials exhibiting localized actuation has hindered the development of actuators that benefit from metamaterial behaviors.

Harnessing mechanical instabilities—considered signs of structural failure in hard actuators—has recently emerged as a robust strategy to design and fabricate functional soft actuators with highly controllable nonlinear behavior. The reversible buckling of elastomeric beams is an example of a mechanical instability that can be harnessed to enable applications in stretchable electronics, switchable metamaterials, and soft fluidic actuators. Fluidic, buckling-based soft actuators typically consist of an elastomeric slab patterned with two dimensional periodic arrays of holes perpendicular to the slab sealed by elastomeric membranes. Upon applying negative pressure (vacuum), the buckling of the internal cavities of the soft actuator produces a regular and reversible deformation capable of generating linear and rotational motion. Fluidic actuators can achieve motions with faster response times than actuators made of electroactive polymers and larger amplitudes than dielectric elastomers and ionic conducting polymer films. However, the variety of motions achievable by fluidic actuators is limited by the need of bulky pneumatic or hydraulic sources, and the difficulty to design and manufacture soft actuators with tailored three-dimensional (3D) architectures.

Recently, small soft robots with embedded magnetic microparticles demonstrated fast and untethered actuation using rotating and alternating magnetic fields. Unfortunately, the scalability of this actuation mechanism is limited by the difficulty to enlarge the area where the magnetic fields can be tuned. Motor-tendon actuation approaches in soft robotics have also demonstrated fast actuation using relatively small and inexpensive motors. Due to their small size, tendons can be attached at multiple locations within a soft robot—even in places where it would be difficult to house other actuators otherwise—providing distributed and continuum actuation. Additionally, tendons offer a lightweight, low inertia platform for long-range force transmission with negligible backlash. The friction between the tendons and the soft body of the robot, however, introduces nonlinearities that reduce the controllability of the system.

Therefore, there remains a need to develop 3D-architected soft machines with topologically encoded actuation.

SUMMARY

The present disclosure generally relates to 3D-architected soft machines with topologically encoded actuation, and methods of making and using the 3D-architected soft machines.

In one embodiment, the present disclosure provides a soft bodied robotic device comprising a flexible 3D architected body with a plurality of interconnected cells, wherein the 3D architected body is configured to reversibly expand, contract, bend, or twist in a controllable direction when the plurality of interconnected cells are triggered by one or more actuators to provide motions of the flexible 3D architected body.

In one embodiment, the present disclosure provides a method of making a soft bodied robotic device, wherein the method comprises:
  providing a CAD model of an object with a surface;
  performing a tessellation algorithm over the volume or surface of the CAD model; and
  fabricating a flexible 3D architected body based on the CAD model tessellation, by 3D printing, molding, or injection molding using a material comprising elastomer, elastomeric composite, metal, polymers, or any combination thereof.

DETAILED DESCRIPTION

Figure 1:
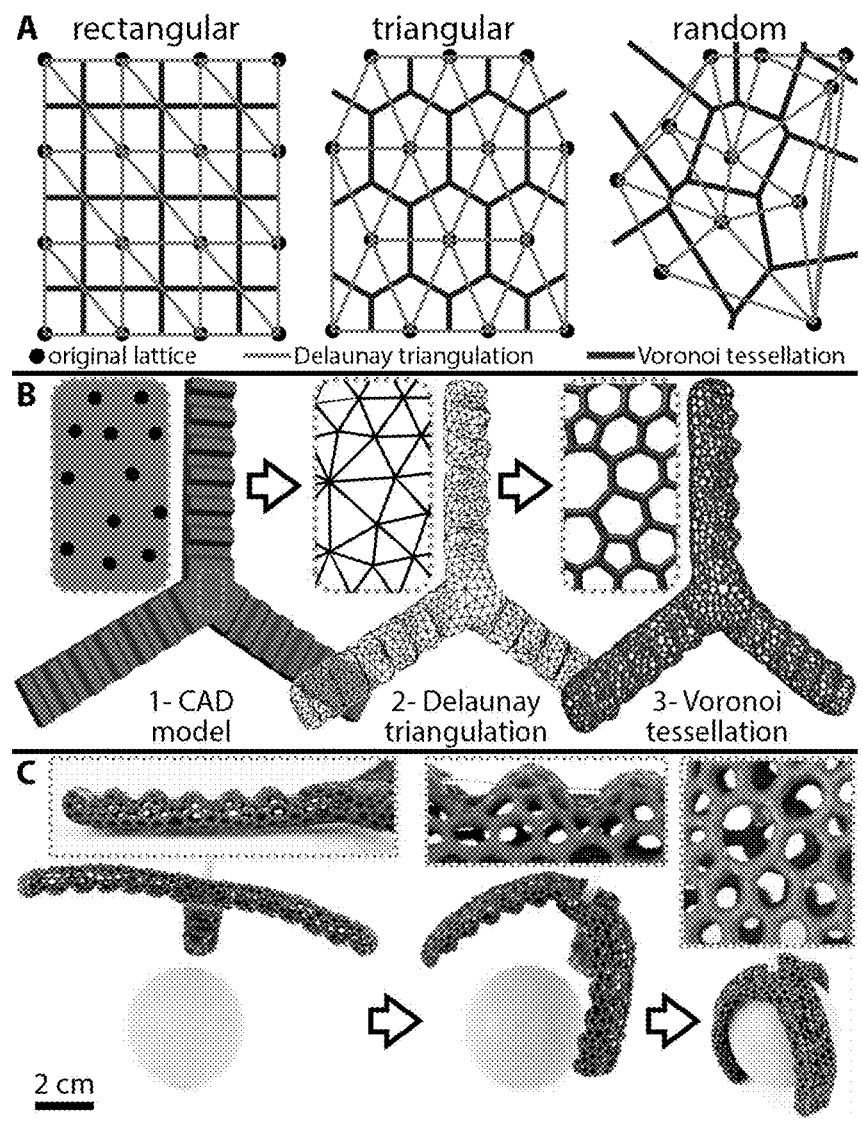
FIG. 1 shows the design, fabrication, and actuation of ASMs. (A) Automated algorithms transform a set of lattice points to their Delaunay triangulation and Voronoi tessellation. Examples show rectangular, triangular, and random lattice arrangements. (B) Transformation of a simple model designed using commercial CAD software into its low-density ASM counterpart to design a functional gripper. The lattice points of the CAD model are randomly distributed. (C) Motor-tendon-based actuation mechanism of an ASM gripper 3D printed with a flexible photopolymer. Insets show the sparse, hollow structure, and how the nylon threads act as tendons to actuate the ASM gripper—enabling it to conformably grip a ping-pong ball.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

The limited range of mechanical responses achievable by materials compatible with additive manufacturing hinders the 3D printing of continuum soft robots with programmed actuation.

The present disclosure provides rapid design and fabrication of low-density, 3D architected soft machines by combining Voronoi tessellation and additive manufacturing. On tendon based actuation, Architected Soft Machines (ASMs) deform according to the topologically encoded buckling of their structure. ASMs are simple to design, fast and inexpensive to fabricate, light in weight, and easy to actuate. This class of soft machines is versatile: a single tessellation algorithm rapidly transforms primitive shapes, such as cuboids or cylinders, into actuators capable of producing a wide range of motions (contraction, twisting, bending, and cyclical motion) upon tendon-based actuation. A variety of high-level motions such as compression, twisting, bending, and cyclical motion can be encoded in the cellular topology of ASMs by controlling the beam orientation, cell size, or beam thickness of the Voronoi designs. Simple topological transformations applied to the primitive solids enable, after Voronoi tessellation, the design of ASMs with mechanical metamaterial behaviors. ASMs exhibiting densities as low as 0.094 g/cm$^3$ (~8% of bulk polymer) can be rapidly built by stereolithographic 3D printing of flexible photopolymers. ASMs with embedded electronic components can also be fabricated by the injection molding of elastomers. The buckling of ASMs can be easily programmed by inducing gradients in the thickness of their flexible beams or by the localized enlargement of the Voronoi cells to generate complex motions such as multifinger gripping or quadrupedal locomotion. The topological architecture of these low density soft robots confers them with the stiffness necessary to recover their original shape even after ultrahigh compression (400%) and extension (500%). ASMs expand the range of mechanical properties currently achievable by 3D printed or molded materials to enable the fabrication of soft actuators with auxetic mechanical metamaterial properties.

Design, Fabrication, and Actuation of ASMs

Figure 2:
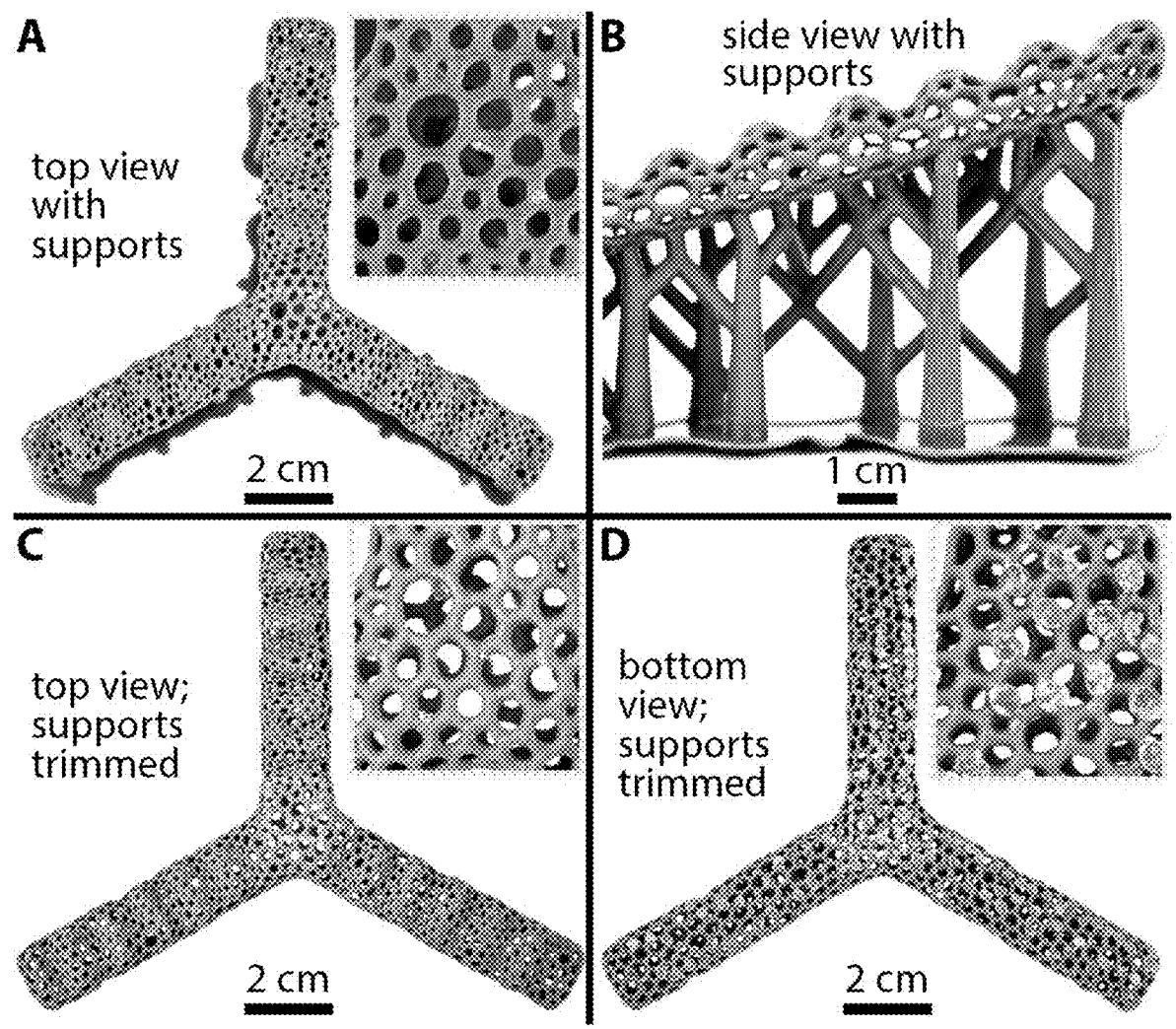
FIG. 2 shows ASM gripper fabricated by 3D printing. (A) Top view of a 3D printed gripper with support structures. (B) Side view of the gripper showing the location and arrangement of the support structures. (C) Top view of the gripper (gripping surface), after the support structures are removed. (D) Bottom view of the gripper showing where the support structures were attached.

ASMs can be easily designed from any CAD model by applying an automated algorithm that first performs a Delaunay triangulation on the original lattice (topology) of the model, and then a Voronoi tessellation over the Delaunay triangles (FIG. 1A and code S1, S2). As a proof of principle, the present disclosure provides a simple and rapid design of a low-density soft gripper weighing 11.8 g (effective density=0.28 g cm$^{-3}$, 24% of bulk material), by combining standard primitives (cuboids) and applying the Delaunay and Voronoi algorithms to the model (FIG. 1B). The resulting 3D-architected design is then 3D printed using a flexible photopolymer (FIG. 2) to create an ASM. After the ASMs were 3D printed, nylon threads were manually tied to the Voronoi cells at the end of the soft actuator, these threads were passed along its beam structure, and small DC motors were used to compress the 3D-architected geometry and induced its controlled buckling to achieve conformal gripping (FIG. 1C). This design, fabrication, and actuation approach enables users with minimal training in CAD modeling to rapidly create low-density soft machines with desired topologically encoded actuation.

Programming Actuation by Controlling Beam Orientation

Figure 3:
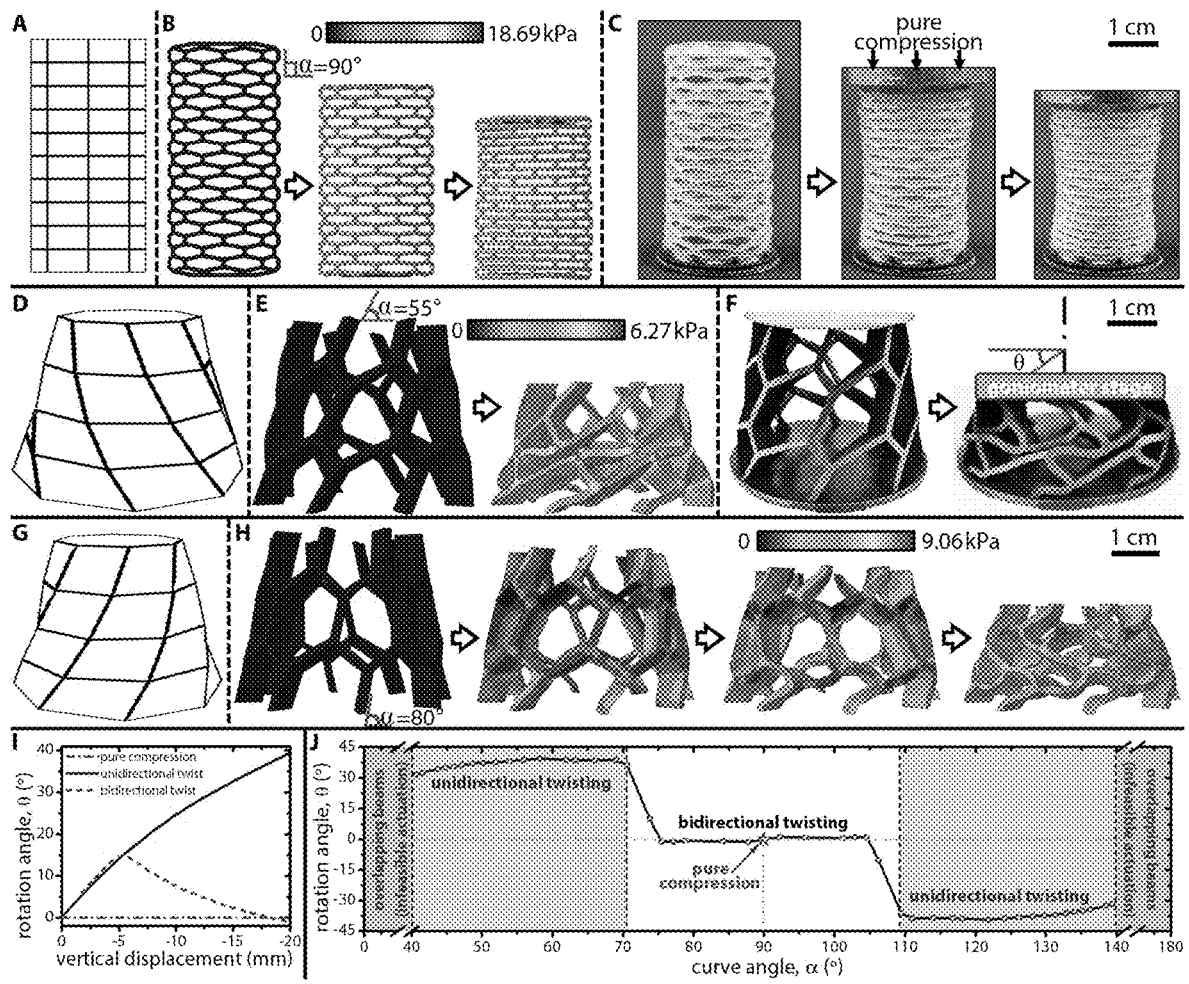
FIG. 3 shows programming actuation of auxetic ASMs by controlling beam orientation. (A) Initial rectangular lattice used to design a compression actuator. (B) FEM simulation showing the stress distribution in an ASM designed for pure compression ($\alpha=90°$), as a displacement-controlled normal load is applied from the top. (C) Experimental demonstration of the negative Poisson's ratio exhibited by the ASM shown in (B). (D) Initial lattice used to design a unidirectional twisting actuator via Voronoi tessellation. (E) FEM simulation showing the stress distribution in the resulting ASM ($\alpha=55°$), under a displacement-controlled vertical load. (F) Experimental demonstration of the ASM shown in (E) twisting from $\theta=0$ to $40°$ upon compression. (G) Initial lattice used to design a bidirectional twisting actuator. (H) FEM simulation showing the stress distribution in an ASM programmed for bidirectional twisting ($\alpha=80°$), under a displacement-controlled vertical load. The twisting direction of the top of the ASM switches from CCW to CW midway between the $2^{nd}$ and $3^{rd}$ frames shown, at a compression of ~5 mm. (I) Rotation of the top surface of the ASM as a function of the vertical displacement for compression and twisting ASMs. ASMs exhibiting pure compression do not rotate, while the rotation of unidirectional twisting ASMs increases monotonically with vertical displacement. The direction of rotation of bidirectional twisting ASMs switches at a vertical displacement of about 5 mm. (J) Actuation regimes obtained by varying the curve angle of the fabricated ASMs.

The final motion of ASMs upon tendon actuation depends on their 3D architecture. Modifying the original topology of a 3D model using simple geometric transformations, it is possible to generate a wide range of ASMs exhibiting similar shapes but different beam configurations and final resulting motions (FIG. 3). 3D models with rectangular lattices, such as the cylinder shown in FIG. 3A, generate Voronoi-based architected structures with a 90° curve angle ($\alpha$)—defined as the maximum acute angle that any beam in the structure makes with the horizontal (FIG. 3B). After 3D printing, ASMs with $\alpha$=90° exhibit pure compression upon tendon actuation, behaving as soft mechanical metamaterials with negative Poisson's ratio (FIG. 3C). The Voronoi cells of these auxetic ASMs accommodate compressive forces by collapsing along the compression axis, preventing rotations (FIG. 3I) and inducing negative Poisson's ratio even when the cells are not reentrant.

Applying simple torsional transformations to the topology of right frustums allows for the generation, after Voronoi tessellation, of ASMs with different rotational actuation. The magnitude of the torsion ($\varphi$) applied to the original frustum and the curve angle ($\alpha$) of the resulting ASMs are experimentally found to be parabolically related. Varying $\alpha$ from 40°-90° enables the control of the rotation angle ($\theta$) described by the top surface of the ASMs upon compression. FIGS. 3D-H demonstrates two representative examples of fabricated ASMs that undergo unidirectional and bidirectional twisting upon tendon-based actuation. The unidirectional twisting ASM ($\alpha$=55°; FIGS. 3D-F) has a rotation angle that increases monotonically with compression, reaching a maximum rotation of $\theta$=40° at a compression of 20 mm (FIG. 3I). The bidirectional twisting ASM ($\alpha$=80°; FIGS. 3G, and H) is a soft mechanical metamaterial whose top surface first rotates clockwise to a maximum of $\theta$=15° at 5 mm compression, and then counterclockwise, returning to $\theta$=0° at a compression of 20 mm (FIG. 3I).

The application of topological torsional transformations to control the resulting a of the ASMs produces soft actuators with different twisting motions along the regimes depicted in FIG. 3J. When $\alpha$ ranges from 40°-70°, ASMs undergo unidirectional twisting, while 70°<$\alpha$<90° induces bidirectional twisting in the ASMs. The regimes are symmetric about $\alpha$=90°, since obtuse angles only cause a reversal in sense. ASMs with $\alpha$<40° or $\alpha$>140° do not twist upon compression due to the physical contact among their beams. Since $\theta$ is almost constant within each of the regimes, unidirectional or bidirectional twisting actuation can be easily encoded in the ASM without requiring an accurate control of $\alpha$. ASMs with more slanted beams, however, require less force to be actuated, inducing lower stresses as predicted by the finite element method (FEM) simulations (FIGS. 3B, E and H).

Programming Actuation by Tuning Beam Thickness

Figure 4:
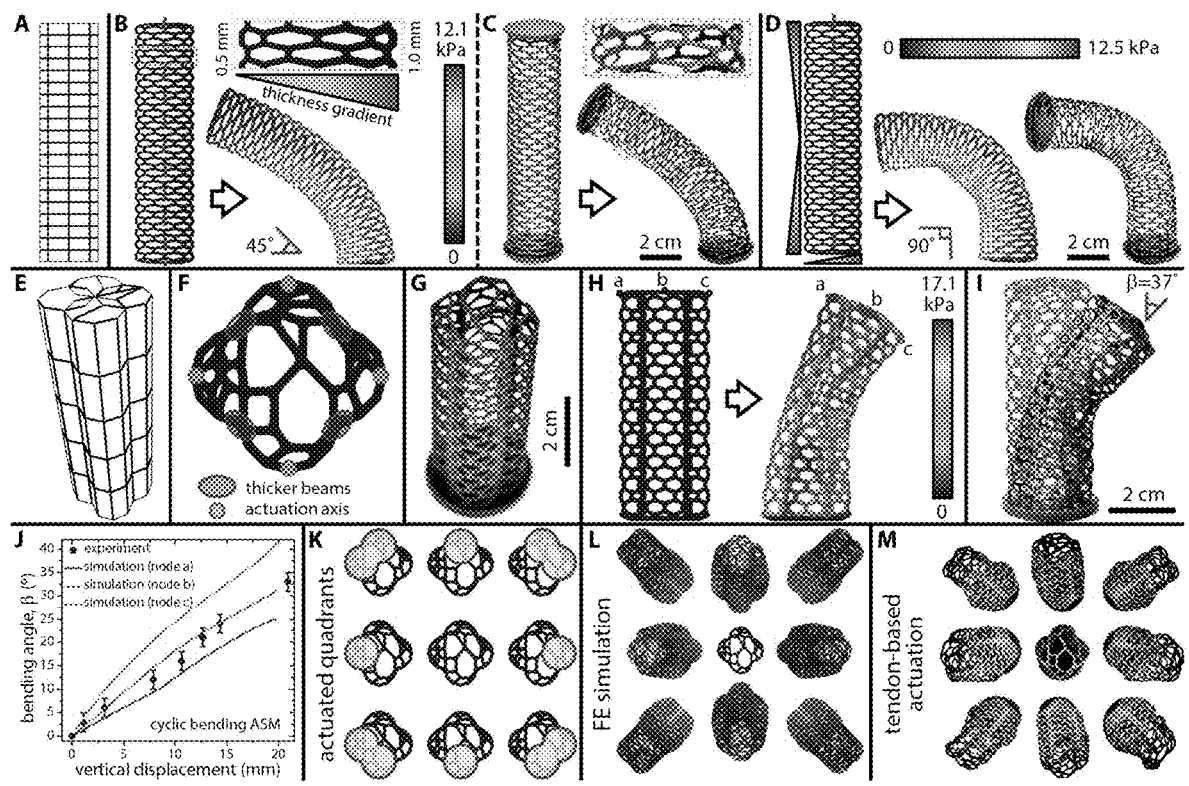
FIG. 4 shows programming actuation of ASMs by tuning beam thickness. (A) Initial rectangular lattice used to design a bending actuator. (B) FEM simulation showing the stress distribution in an ASM with a gradient in the thickness of its beams (linearly increasing from 0.5 mm to 1 mm) perpendicular to the long axis of the structure. The bending axis is shown by a red dashed line. (C) Experimental realization of the ASM depicted in (B). (D) FEM simulation and experimental demonstration of an ASM with two gradients in the thickness of its beams to subtend a bending angle of 90°. (E) Initial lattice used to design an ASM capable of cyclic multi-directional bending. The lattice shown in (A) is replicated four times and joined. (F) Top view of the cyclic bending ASM highlighting the regions with thicker beams and the locations of the tendon-based actuation axes. (G) 3D printed cyclic bending ASM. (H) FEM simulation showing the stress distribution in the cyclic bending ASM upon actuation of one of its quadrants. (I) Experimental tendon-based actuation of the cyclic bending ASM showing a maximum bending angle $\beta=37°$. (J) Dependence of $\beta$ on the vertical displacement due to compression at the three nodes a, b, c shown in (H). Experimentally measured values are for node b. (K) Top view of the cyclic bending ASM showing how rotary motion may be obtained by sequentially actuating different quadrants or combination of quadrants. (L) FEM simulation showing how the cyclic bending ASM responds when the different quadrants shown in (K) are actuated. (M) Experimental rotary motion obtained by the sequential tendon-based actuation of different quadrants (or combination of quadrants) of the ASM.

The actuation of ASMs can be controllably modified by the simple incorporation of gradients and localized differentials in the thickness of the beams integrating their structure. As an example, ASMs with beam structures originally designed for pure compression (FIG. 3A-C) can produce continuum bending on tendon actuation after applying a linear gradient of beam thickness perpendicular to the long axis (FIG. 4A-C). Similarly, it is possible to concentrate the bending at a desired location along the length of an ASM by combining multiple beam thickness gradients. FIG. 4D shows an ASM where the application of orthogonal gradients enables the formation of a 90° elbow bend upon tendon-based compression along the indicated axis.

While it may be straightforward for "hard" mechanical systems to accomplish cyclical motion (using wheels, axles, and bearings), the design of a soft actuator that generates rotary motion is not trivial. The local modification of beam thicknesses in ASMs enables the encoding of cyclic motion utilizing only a single structural component. To design a cyclical motion ASM, this disclosure uses a primitive cylindrical lattice (FIGS. 3A, 4A), replicate it four times, and join it as shown in FIG. 4E. The beam thickness of the resulting Voronoi structure is then increased locally in the four regions where the initial cylinders overlapped (FIG. 4F), to get the final cyclical motion ASM (FIG. 4G). This ASM has four quadrants, which can be independently actuated by individual tendons (FIG. 4F). On actuation, the ASM bends towards the actuated quadrant due to the buckling of its thinner beams (FIGS. 4H, I). Through simulations and experiments, the bending angle ($\beta$) can be easily predicted and calibrated against the vertical displacement of the actuating tendon (FIG. 4J). Rotary motion is achieved by the sequential actuation of adjacent quadrants and pairs of quadrants (FIGS. 4K-M). Note that the rapid design of actuators by simply joining primitive shapes might produce ASMs with asymmetric top and bottom surfaces (FIG. 4F). This asymmetry, however, is a negligible edge effect that does not compromise the symmetry of the rotary motion of the ASM—as demonstrated by simulations (FIG. 4L) and experiments (FIG. 4M).

Topologically Encoding Actuation by Locally Tuning Voronoi Cell Size

Figure 5:
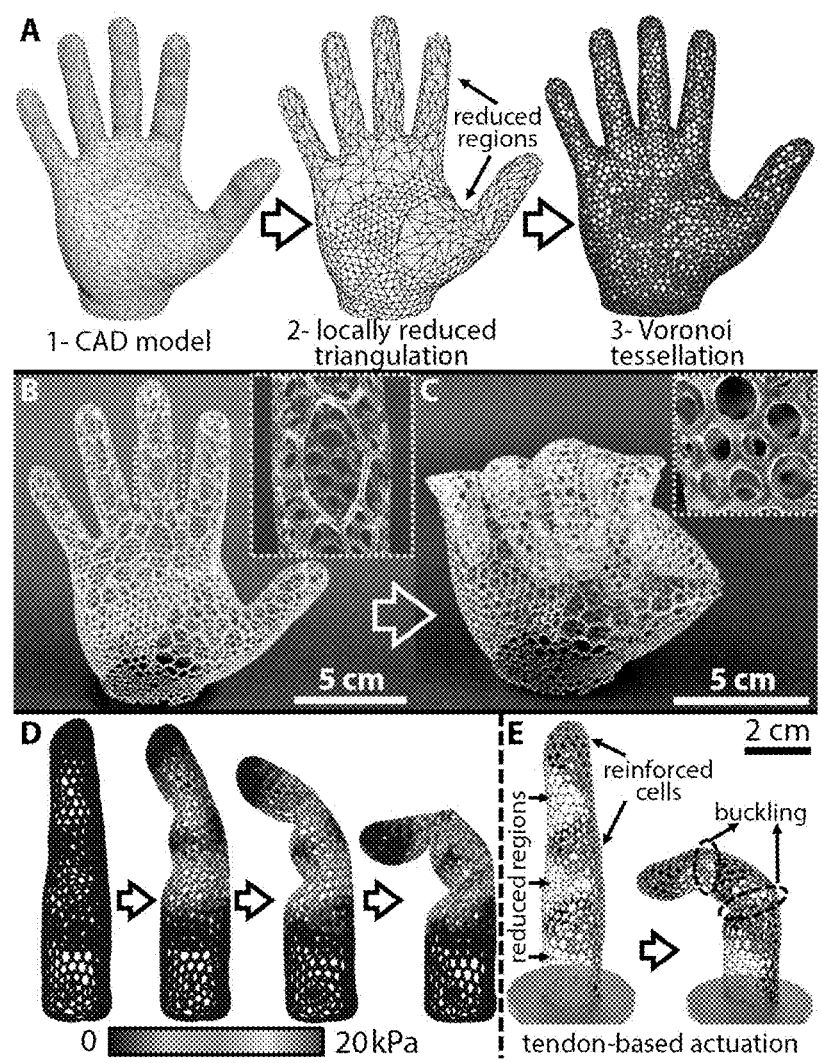
FIG. 5 shows programming actuation in ASMs by locally tuning Voronoi cell size. (A) Starting with an existing CAD model of a hand, the Delaunay triangulation is made sparser over the highlighted areas of its topology, to ensure larger Voronoi cells in those regions. (B) Fabricated ASM hand. Inset shows how larger Voronoi cells are used in front while smaller cells are kept at the back of each finger, enabling their bending. (C) Actuated ASM hand with all fingers closed. Inset shows a zoom-in of the smaller Voronoi cells at the back of a finger. (D) FEM simulation showing the stress distribution in an ASM finger. Localized buckling of the two joints is encoded by tuning both cell size and beam thickness. (E) 3D printed ASM finger showing the regions with larger cells (thin beams) and smaller cells (thick beams). The buckling-induced actuation is achieved by pulling a single tendon fastened at the tip of the finger.

Most CAD tools allow the localized reduction of polygon count, decreasing the number of lattice points, in 3D models. When the Delaunay and Voronoi algorithms are applied to 3D models with non-uniform topological distributions of lattice points, the resulting architected materials will exhibit bigger Voronoi cells over the regions where the original lattice is sparse (FIG. 5A). Tuning the cell density—number of Voronoi cells per unit area—of the resulting ASM enables the deliberate introduction of weak regions in its structure. Upon compression, the buckling of the ASM will concentrate on these weak regions making it possible to program the actuation of the ASMs by simply tuning the lattice density of the original CAD model.

It was 3D printed a Voronoi-based soft robotic hand weighing 12.9 g (effective density=0.094 g cm$^{-3}$, 8.1% of bulk material; FIG. 5B) actuated by five tendons tied to the tip of each finger and pulled through the center of the wrist. When the tendons inside the fingers are pulled, the bigger cells distributed over the palm side of the fingers accommodate the strain and induce their bending (FIG. 5C). The fingers of this ASM can also be independently actuated to perform different gestures. The judicious reduction of polygon count along the carpometacarpal joint enables the sequential flexion and abduction of the thumb upon compression and its adduction and extension when the force exerted by the tendon is released. The uniform distribution of small Voronoi cells over the back of this soft 3D-architected hand prevents the palm from collapsing on itself, even when all fingers are closed (FIG. 5C). Multi-joint kinematics can be easily programmed in ASMs by distributing gradients of both beam thickness and cell size over their topology (FIG. 5E). On tendon-based actuation, regions with larger Voronoi cells and thinner beams accumulate higher stresses (FIG. 5D), localizing buckling and mimicking articular joints (FIG. 5E).

Modular Approach to Build ASMs

Figure 6:
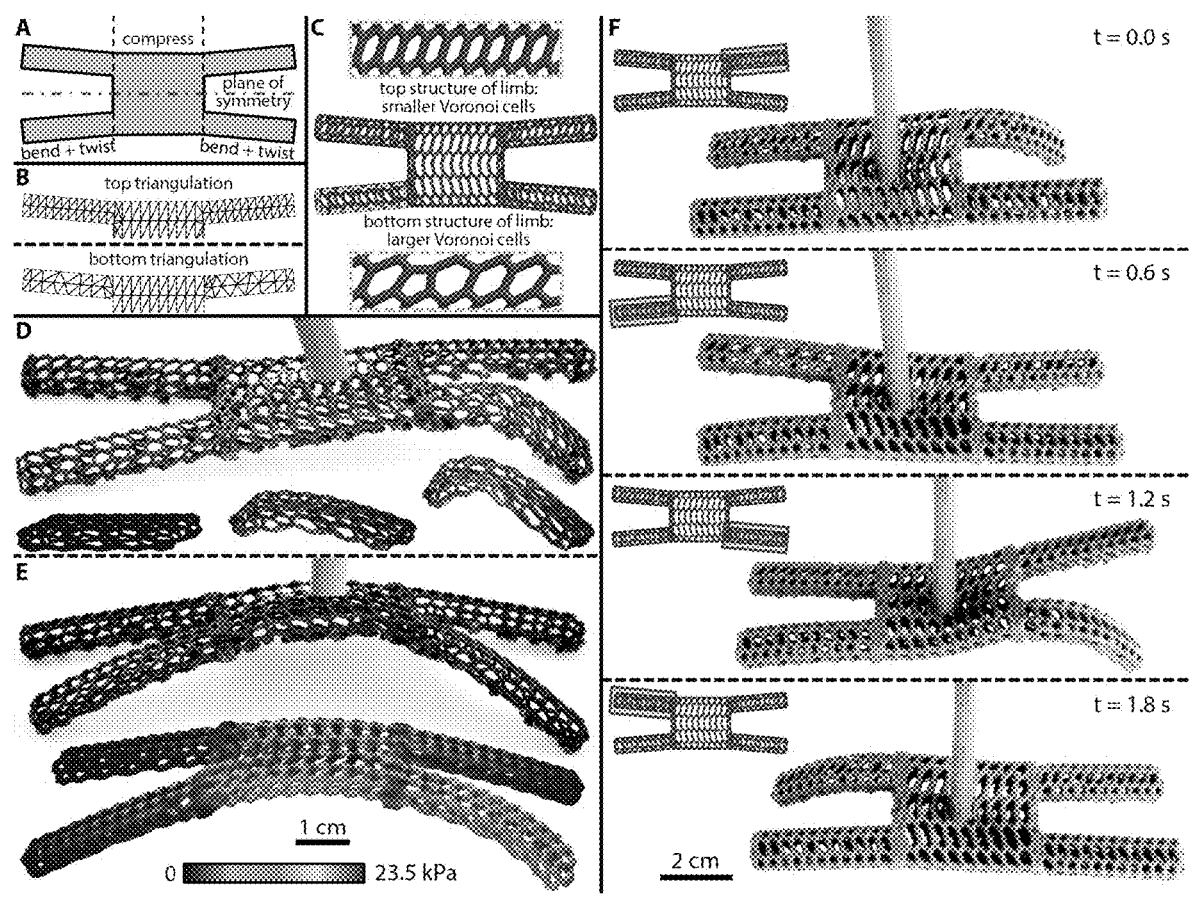
FIG. 6 shows modular design of ASMs—example of a quadruped. (A) Schematics showing the different modules comprising an ASM quadruped: the central body is made of two compression ASMs, while each of the four legs is a module that combines bending and twisting actuation. (B) Delaunay triangulations of the top and bottom surfaces of the ASM quadruped. While the central body has identical triangulations on the top and bottom, the bottom surface of the legs is designed with a sparser triangulation. (C) ASM quadruped, with insets showing the cell size differences between the top and bottom surfaces of each leg. (D) 3D printed ASM quadruped and FEM simulation showing the tendon-based actuation of one leg. Actuation is achieved by the localized deformation and buckling of beams. (E) The central body of the quadruped is lifted during the transition between the sequential actuation of two different legs. FEM simulation shows the stress distribution during this transition phase. (F) Snapshots from a video clip showing a basic crawling gait. Insets indicate the leg actuated in each frame.

The low density, easy-to-control actuation, and the adaptability to their environment through mechanical deformation provide ASMs with potential applications in devices that locomote/translate. FIG. 6A-C showed the modular approach followed to design an architected soft robotic quadruped that crawls due to the combination of bending/twisting modules (legs) and compression modules (central body). The legs of this robot are independently actuated by one tendon (tied to the end of each leg). The four tendons operating the legs are pulled from a common Bowden cable placed in the center of the robot (FIG. 6D-F). The beams of this Voronoi-based soft quadruped are designed so that the legs buckle first (FIG. 6D) when they are pulled by the tendon, lifting the quadruped and transferring the strain to the central part of the robot, which then compresses and absorbs part of the localized deformation sustained by the leg (FIG. 6E). A basic crawling gait of the present disclosure was developed by simply pulling the tendons in sequence (FIG. 6F), without requiring any asymmetric friction in the bottom side of the robot. Using this gait, the robot was driven at an average speed of 52.8±6.6 m/h (~480 body lengths/h; 24% of body length/cycle). The weight of this robot is 8.25 g (effective density=0.153 g cm$^{-3}$; 13.2% of bulk material) and that of the Bowden cable carried by the robot during crawling is 63 g.

Highly Compressible and Stretchable Elastomeric ASMs

Figure 7:
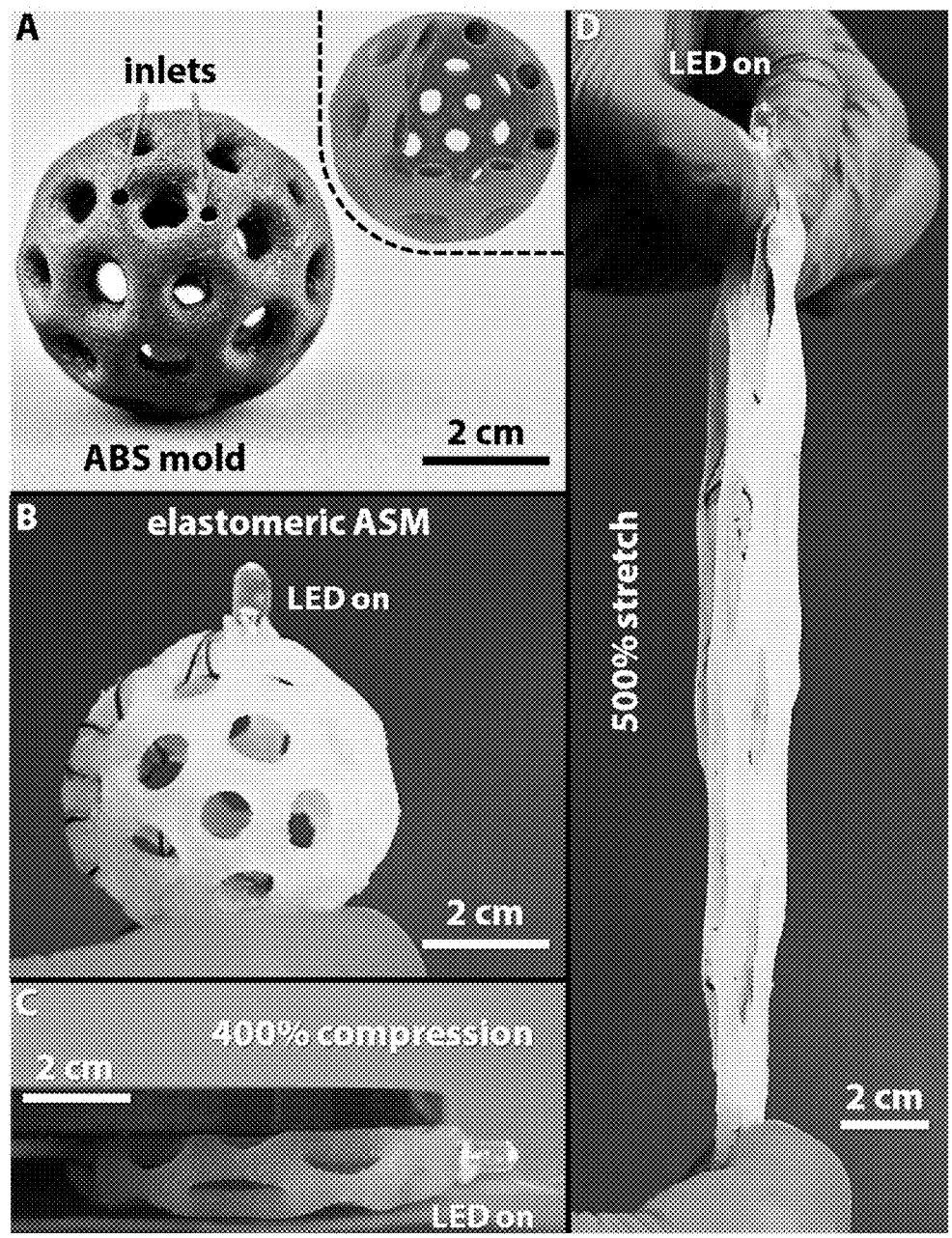
FIG. 7 shows highly deformable elastomeric ASMs with embedded electronics. (A) 3D printed ABS mold used to fabricate an elastomeric ASM by injection molding. Inset shows a quarter-section cut-away view with hollow internal channels. (B) Elastomeric ASM fabricated in Ecoflex™ 00-30. Two conductive threads (braided as a helical wire) and a small battery are embedded to power an LED. (C) Fabricated elastomeric ASM showing a reversible compressibility up to 400%. (D) Demonstration of reversible stretching as high as 500%.

The design method presented in this disclosure is compatible with the fabrication of ASMs out of elastomeric materials, which might currently be difficult to 3D print, by injection molding using dissolvable molds. FIG. 7A shows a hollow 3D printed acrylonitrile butadiene styrene (ABS) mold with two inlets used to inject the elastomeric premixture (Ecoflex™ 00-30). After the elastomer cures inside the mold, the fully elastomeric ASM was retrieved by dissolving the mold in acetone.

Electrical components can be easily integrated into elastomeric ASMs to extend their functionality. Flexible conductive threads were passed along the structure of the ASM and coated over them with a thin (about 100 μm) layer of elastomer to prevent delamination. FIG. 7B shows an elastomeric Voronoi sphere with an integrated LED, conducting threads, and a battery (LED and battery are placed at opposite poles of the ASM). The topological architecture of this elastomeric structure enhances its stiffness and prevents its collapse due to its own weight, in contrast to the behavior of an unarchitected hollow sphere of the same dimensions. The low density of the ASM and the stretchability of the elastomer used in its fabrication facilitates ultrahigh reversible compression (up to 400%; FIG. 7C) and extension (up to 500%; FIG. 7D) without affecting the functioning of the integrated electronics. The embedded conductors are able to accommodate the ultrahigh stretching due to their low helix angle (<45°) spiral trajectory. These versatile design and fabrication strategies have the potential to be useful in the development of stretchable electronic devices toward emerging applications.

Therefore, the present disclosure introduced ASMs: a new class of soft robots that benefit from their 3D-architected structure to expand the range of mechanical properties and behaviors achievable by 3D printed soft robots. The present disclosure demonstrates that ASMs are simple to design, rapid to prototype, and easy to actuate. ASMs also have several significant advantages over other soft robotic systems. First, their architected structure confers them with effective densities as low as 8.1% of the bulk polymer, facilitating their use in lightweight robotic applications. Second, the final actuation of the soft robot can be encoded in its topology either by applying thickness gradients to its flexible beams or by selectively enlarging some of its Voronoi cells. Further, the anisotropic elasticity programmed on the architected structure of the ASMs enables continuum or localized actuation, to mimic both continuously deformable bodies and multi-joint systems. In addition, complex soft robotic motion—such as multi-finger gripping (FIG. 2C, 5C) and quadrupedal locomotion (FIG. 6F)—can be easily achieved by combining topologies that generate different actuations via a modular approach. Although most of the ASMs presented in this work were directly 3D printed, the present disclosure also demonstrated that ASMs can be fabricated out of materials incompatible with 3D printing: by injection molding using dissolvable molds. This approach to build elastomeric ASMs facilitates the embedding of functional electronic components in soft robotic systems that can withstand ultrahigh compression (400%) and stretching (500%). ASMs, at their present level of development, also have two limitations: (i) The actuators are tethered to the motors providing tendon-based actuation through a Bowden cable. Untethered actuation will require the inclusion of small motors, a battery, and a controller into the structure of the ASM. The hollow architecture of ASMs, however, leaves the interior of these soft robots available for housing actuation mechanisms and minimizes the friction with the tendons. (ii) The minimum beam thickness of ASMs (500 µm in this work) is limited by the resolution of the 3D printer used. Nevertheless, the design and fabrication strategy proposed to generate ASMs from conventional CAD models is versatile and can be easily adopted by high resolution two-photon polymerization systems to fabricate ASMs at the micro- and nanoscale.

Recent advancements in additive manufacturing, such as multi-material and functionally graded 3D printing, have paved the way toward 3D printable soft robots. Unfortunately, the palette of materials compatible with 3D printing is limited and insufficient to fabricate soft robots with spatially textured mechanical metamaterial properties and functionality. ASMs expand the material space accessible to 3D printed or molded materials, enabling the fabrication of soft robots with auxetic mechanical metamaterial properties using a single material. The design and fabrication methods proposed in this work give general guidelines for users with minimal CAD experience to spatially encode high-level actuation toward the development of more advanced applications in soft robotics, prosthetics, wearable devices, and stretchable electronics. The present disclosure envisions that the simplicity, low-cost, and modularity of this new class of soft robots, which can be fabricated by anybody with access to a conventional 3D printer, will lower barriers to entry for soft robotics.

Materials and Methods

Rapid Design of ASMs Using Voronoi Tessellation

The present disclosure used 3ds Max 2018 (Autodesk Inc.) to design 3D CAD primitives—simple geometric shapes such as cylinders, spheres, or cuboids—and other complex 3D designs. The topological vertices of these CAD designs define the initial lattice points for the application of the Delaunay and Voronoi algorithms. Exporting the CAD designs as stereolithography (*.STL) files automatically performs a Delaunay triangulation on the 3D models. The present disclosure then used Meshmixer 3.4 (Autodesk Inc.) to transform the triangulated models into low-density, 3D-architected designs using the Voronoi tessellation algorithm included in this free software. The application of these algorithms is fast (~1 s) and the thickness, geometry, and density of the beams integrating the final 3D-architected designs can be easily tuned.

3D Printing ASMs

The present disclosure used a high-resolution stereolithography (SLA) 3D printer (Form 2, Formlabs Inc.) to build ASMs using flexible photocurable polymers (FLGR01 and FLGR02, bulk density=1.15 g cm$^{-3}$; Formlabs Inc.).

After 3D printing, the support material was removed by hand using predetermined breaking points. For ASMs with beams thicker than 1 mm, the present disclosure post-cured the structures in UV light ($\lambda$=405 nm) at 60° C. for 15 min to ensure uniform mechanical properties across the beam thickness.

Fabrication of Elastomeric ASMs by Injection Molding

To fabricate ASMs using elastomeric materials that would be difficult to 3D print due to their relatively long curing times, such as Ecoflex™ 00-30, the present disclosure used dissolvable hollow polymeric molds (FIG. 7A). These hollow molds were 3D printed by fused deposition modeling (FDM; F170, Stratasys Ltd.) using ABS, with a proprietary water-soluble support material (F123 QSR; Stratasys Ltd.). The supports in the hollow internal channels were dissolved by sonicating in water. After letting the molds dry overnight at ambient conditions, Ecoflex™ 00-30 pre-mixture (1:1 w/w; Smooth-on Inc.) was injected inside the hollow channels of the mold and any trapped air bubbles were removed by degassing in a desiccator at 36 Torr for 3 min. After curing the elastomer by baking the ensemble at 60° C. for 45 min, the ABS mold was dissolved by sonicating in acetone for 30 min—generating the final freestanding elastomeric ASM.

Actuation and Control

Small, high torque DC motors (9 g weight, 2.5 Kg 6 V, 60 RPM; Uxcell Inc.) were used to actuate ASMs by pulling from tendons made of low friction nylon cables (diameter=0.25 mm). The tendons were manually tied to the beams of the ASMs, crossing multiple Voronoi cells (FIG. 1C) to distribute the pressure induced by the tendon over several flexible beams. The DC motors providing tendon-based actuation are controlled using a programmable open-source microcontroller (UNO; Arduino Inc.).

Finite Element Simulations

Finite element method (FEM) simulations were performed to model the deformation of the ASMs upon tendon-based actuation and to evaluate the stress distribution along their structure. Voronoi tessellated models generated in Meshmixer were passed through a finite element pre-processor, HyperMesh 2017 (Altair Engineering Inc.), to optimize the meshing and reduce computing time. While several constitutive hyperelastic models exist for modelling the behavior of elastomers, it was found that the experimental findings are most accurately described by a 3-term Ogden model with the following parameters: $\mu_1$=0.024361 MPa, $\mu_2$=6.6703×10$^{-5}$ MPa, $\mu_3$=4.5381×10$^{-4}$ MPa, $\alpha_1$=1.7138, $\alpha_2$=7.0679, $\alpha_3$=3.3659, $D_1$=3.2587 MPa$^{-1}$, $D_2$=$D_3$=09. The simulations were implemented in Abaqus/CAE 6.13-1 (Simulia Corp., Providence, R.I.) using C3D8R (for twisting actuators), C3D10M (for quadruped), and C3D4H (for all others) elements. All loadings are modeled as displacement-controlled, in agreement with tendon-based actuation.

Mechanical Characterization

Tensile testing of dogbone-shaped 3D printed specimens of the flexible photopolymers was used to fabricate the ASMs, according to ASTM D412-C specifications. The samples were held in a universal testing machine (MTS Insight 10; MTS Systems Corp.) equipped with a 1 kN load cell (model 661.18.F01), and pulled at a loading rate of 0.083 mm/s (5 mm/min). This tensile test induces a strain rate of 2.77×10$^{-3}$ s$^{-1}$ (0.167 min$^{-1}$) for a gage length of 30 mm. All samples had a width of 4.5 mm and a thickness of 2.54 mm. The load-extension data recorded by the universal testing machine was converted to engineering stress-strain curves and used to determine Ogden model parameters.

In one embodiment, the present disclosure provides a soft bodied robotic device comprising a flexible 3D architected body with a plurality of interconnected cells, wherein the 3D architected body is configured to reversibly expand, contract, bend, or twist in a controllable direction when the plurality of interconnected cells are triggered by one or more actuators to provide motions of the flexible 3D architected body.

In one embodiment, the present disclosure provides a soft bodied robotic device, wherein the structure of the device is 3D architected throughout its volume and/or over its surface.

In one embodiment, the present disclosure provides a soft bodied robotic device, wherein the flexible 3D architected body has a substantially hollow structure.

In one embodiment, the present disclosure provides a soft bodied robotic device, wherein flexible 3D architected body further comprises one or several tendon-based actuator(s) capable of providing motions for the flexible 3D architected body.

In one embodiment, the present disclosure provides a soft bodied robotic device, wherein the actuator comprises pneumatic, hydraulic, electronic, digital, magnetic, electromagnetic, piezo electric, electroactive, thermal, shape memory alloy actuator, or any combination thereof.

In one embodiment, the present disclosure provides a soft bodied robotic device, wherein the material used for the fabrication of device comprises elastomer, elastomeric composite, metal, polymers, or any combination thereof.

In one embodiment, the present disclosure provides a soft bodied robotic device, wherein the architected body comprises a reinforcing material to increase toughness and resistance to damage. In one aspect, the reinforcing material may be but is not limited to a string or a wire of any suitable metal or non-metal material that runs along the cell/beam of the architected body. In one aspect, the reinforcing material may be incorporated into the material used for the fabrication of device.

In one embodiment, the present disclosure provides a soft bodied robotic device, wherein the flexible 3D architected body has a compressibility of up to 400%, and/or a stretchability of up to 500%.

In one embodiment, the present disclosure provides a soft bodied robotic device, wherein the device can host functional components comprising electronics, displays, sensors, motors, actuators, or any combination thereof.

In one embodiment, the present disclosure provides a soft bodied robotic device, wherein orientation, thickness, size of said cells of the flexible 3D architected body can be tuned through a triangulation, tessellation, or mesh refinement algorithms to allow the flexible 3D architected body to make reversible continuum or articulated motions comprising expanding, contracting, bending, twisting, or any combination thereof.

In one embodiment, the present disclosure provides a soft bodied robotic device, wherein its structure further comprises at least one different flexible 3D architected body.

In one embodiment, the present disclosure provides a soft bodied robotic device, wherein the flexible 3D architected body has a low density that is 5-25% of the bulk density of the material used to fabricate the flexible 3D architected body.

In one embodiment, the present disclosure provides a soft bodied robotic device, wherein the flexible 3D architected body is a gripping device capable of bending in a preferential direction upon actuation of an actuator. In one aspect, the actuator is tendon-based actuator. In one aspect, the gripping device comprises one or more fingers capable of exhibiting complex artificial or bioinspired gripping strategies.

In one embodiment, the present disclosure provides a soft bodied robotic device, wherein the flexible 3D architected body is an exploration device with leg-based locomotion and controllable gait.

In one embodiment, the present disclosure provides a soft bodied robotic device, wherein the flexible 3D architected body is a cyclic actuator capable of three-dimensional motion.

In one embodiment, the present disclosure provides a soft bodied robotic device, wherein the final motion of the flexible 3D architected body exhibits mechanical metamaterial properties such as zero Poisson's ratio, negative Poisson's ratio, and unidirectional or bidirectional twisting upon pure compression.

In one embodiment, the present disclosure provides a soft bodied robotic device, wherein the flexible 3D architected body is fabricated with a method comprising:
  providing a CAD model of an object with a surface;
  performing a tessellation algorithm over the volume or surface of the CAD model; and
  fabricating a flexible 3D architected body based on the CAD model tessellation by 3D printing, molding, or injection molding using a material comprising elastomer, elastomeric composite, metal, polymers, or any combination thereof.

In one aspect, the tessellation algorithm used in the fabricating method comprises Voronoi algorithm, Delaunay algorithm, or a combination thereof.

In one embodiment, the present disclosure provides a method of fabricating a soft bodied robotic device, wherein the method comprises:
  providing a CAD model of an object with a surface;
  performing a tessellation algorithm over the volume or surface of the CAD model; and
  fabricating a flexible 3D architected body based on the CAD model tessellation by 3D printing, molding, or injection molding using a material comprising elastomer, elastomeric composite, metal, polymers, or any combination thereof.

In one embodiment, the present disclosure provides a method of fabricating a soft bodied robotic device, wherein the method comprises Voronoi algorithm, Delaunay algorithm, or a combination thereof. In one aspect, the Delaunay algorithm is applied first and then followed by the Voronoi algorithm.

Those skilled in the art will recognize that numerous modifications can be made to the specific implementations described above. The implementations should not be limited to the particular limitations described. Other implementations may be possible.

Code S1 and S2 for Design, fabrication, and actuation of ASMs:

Code S1. MATLAB code for Delaunay triangulation

```
FlexiLab, School of Industrial Engineering, Purdue University
@deftypefn {Loadable Function} {@var{tri}=} delaunay (@var{x}, @var{y})
```

-continued

Code S1. MATLAB code for Delaunay triangulation

```
@deftypefnx {Loadable Function} {@var{tri}=} delaunay (@var{x}, @var{y}, @var{opt})
The return matrix of size [n, 3] contains a set of triangles which are
described by the indices to the data point x and y vector.
The triangulation satisfies the Delaunay circumcircle criterion.
No other data point is in the circumcircle of the defining triangle.

A third optional argument, which must be a string, contains extra options
passed to the underlying qhull command. See the documentation for the
Qhull library for details.

@example
x = rand(1,10);
y = rand(size(x));
T = delaunay(x,y);
X = [ x(T(:,1)); x(T(:,2)); x(T(:,3)); x(T(:,1)) ];
Y = [ y(T(:,1)); y(T(:,2)); y(T(:,3)); y(T(:,1)) ];
axis([0,1,0,1]);
plot(X,Y,'b;;',x,y,'r*;;');
@end example
@end deftypefn
@seealso{voronoi, delaunay3, delaunayn}
function ret = delaunay (x,y,opt)
    if ((nargin != 2) && (nargin != 3))
        usage ("delaunay(x,y[,opt])");
    endif
    if (is_vector(x) && is_vector(y) && (length(x) == length(y)) )
        if (nargin == 2)
            tri = delaunayn([x(:), y(:)]);
        elseif isstr(opt)
            tri = delaunayn([x(:), y(:)], opt);
        else
            error("third argument must be a string");
        endif
    else
        error("first two input arguments must be vectors of same size");
    endif
    if nargout == 0
        x = x(:).'; y = y(:).'
        X = [ x(tri(:,1)); x(tri(:,2)); x(tri(:,3)); x(tri(:,1)) ];
        Y = [ y(tri(:,1)); y(tri(:,2)); y(tri(:,3)); y(tri(:,1)) ];
        plot(X,Y,'b;;',x,y,'r*;;');
    else
        ret = tri;
    endif
endfunction
```

Code S2. MATLAB code for Voronoi Tessellation

```
FlexiLab, School of Industrial Engineering, Purdue University
@deftypefn {Function File} { } voronoi (@var{X},@var{Y})
@deftypefnx {Function File} { } voronoi (@var{X},@var{Y},"plotstyle")
@deftypefnx {Function File} { } voronoi (@var{X},@var{Y},"plotstyle",@var{OPTIONS})
@deftypefnx {Function File} {[@var{vx}, @var{vy}] =} voronoi (@var{X},@var{Y})
plots voronoi diagram of points @var{X},@var{Y}.
The voronoi facets with points at infinity are not drawn.
[@var{vx}, @var{vy}] = voronoi(...) returns the vertices instead plotting the
diagram. plot (@var{vx}, @var{vy}) shows the voronoi diagram.

A fourth optional argument, which must be a string, contains extra options
passed to the underlying qhull command. See the documentation for the
Qhull library for details.

@example
x = rand(10,1); y = rand(size(x));
h = convhull(x,y);
[vx,vy] = voronoi(x,y);
plot(vx,vy,"-b;;",x,y,"o;points;",x(h),y(h),"-g;hull;")
@end example

@end deftypefn
@seealso{voronoin, delaunay, convhull}
* limit the default graph to the input points rather than the whole diagram
* provide example
* use unique(x,"rows") rather than ___unique_rows___
```

-continued

Code S2. MATLAB code for Voronoi Tessellation

```
Added optional fourth argument to pass options to the underlying
qhull command
function [varargout] = voronoi (x, y, plt, opt)
        if (nargin < 2 || nargin > 4)
            usage ("voronoi (x, y[, plt[, opt]])")
        endif
        if (nargin < 3)
            plt = "b;;";
            ## if not specified plot blue solid lines
        endif
          if (nargin == 4)
            if (! isstr (opt))
                error ("fourth argument must be a string");
            endif
        else
            opt = " ";
        endif
        lx = length (x);
        ly = length (y);
        if (lx != ly)
            error ("voronoi: arguments must be vectors of same length");
        endif
        [p, lst, infi] = __voronoi__ ([x(:),y(:)], opt);
        idx = find (!infi);
        ll = length (idx);
        k = 0;r = 1;
        for i = 1:ll
            k += length (nth (lst, idx(i)));
        endfor
        vx = zeros (2,k);
        vy = zeros (2,k);
        for i=1:ll
            fac = nth (lst, idx(i));
            lf = length(fac);
            fac = [fac, fac(1)];
            ft = fac(1:length(fac)-1);
            sec = fac(2:length(fac));
            vx(:,r:r+lf-1) = [p(fst,1),p(sec,1)]';
            vy(:,r:r+lf-1) = [p(fst,2),p(sec,2)]';
            r += lf;
        endfor
        [vx,idx] = unique(vx,"rows");
        vy = vy(idx,:);
        if (nargout == 0)
            lim = [min(x(:)), max(x(:)), min(y(:)), max(y(:))];
               axis(lim+0.01*[[−1,1]*(lim(2)−lim(1)),[−1,1]*(lim(4)−lim(3))]);
            plot (vx, vy, plt, x, y, 'o;;');
        elseif (nargout == 2)
            vr_val_cnt = 1; varargout{vr_val_cnt++} = vx;
            varargout{vr_val_cnt++} = vy;
        else
            error ("only two or zero output arguments supported")
        endif
endfunction
```

We claim:

1. A soft-bodied robotic device comprising a flexible 3D architected body composed of a plurality of interconnected beams, is distributed throughout a volume or only over a surface to provide a substantially hollow structure wherein the 3D architected body is configured to reversibly expand, contract, bend, or twist in a controllable direction when a tension along the interconnected beams lead to coordinated bending and/or buckling of the interconnected beams triggered by tendon-based actuators capable of applying tension and controlling propagation of elastic instabilities through the interconnected beams to provide motions for the flexible 3D architected body, wherein the motions of the flexible 3D architected body upon actuation are defined by programming an elasticity of the interconnected beams.

2. The soft bodied robotic device of claim 1, wherein the architected body comprises a reinforcing material to increase toughness and resistance to damage.

3. The soft bodied robotic device of claim 1, wherein the flexible 3D architected body has a compressibility of up to 400%, and/or a stretchability of up to 500%.

4. The soft bodied robotic device of claim 1, wherein the device can host functional components selected from the group consisting of electronics, displays, sensors, motors, actuators, or any combination thereof.

5. The soft bodied robotic device of claim 1, wherein orientation, thickness, size of cells formed by the interconnected beams of the flexible 3D architected body can be tuned through triangulation, tessellation, or mesh refinement algorithms to allow the flexible 3D architected body to make reversible continuum or articulated motions comprising expanding, contracting, bending, twisting, or any combination thereof.

6. The soft bodied robotic device of claim 1, further having different 3D architected modules.

7. The soft bodied robotic device of claim 1, wherein the flexible 3D architected body has a low density that is 5-25% of a bulk density of a material used to fabricate the flexible 3D architected body.

8. The soft bodied robotic device of claim 1, wherein the flexible 3D architected body is a gripping device capable of bending in a preferential direction upon tendon-based actuation.

9. The soft bodied robotic device of claim 8, wherein the gripping device comprises one or more fingers capable of exhibiting complex artificial or bioinspired gripping strategies.

10. The soft bodied robotic device of claim 1, wherein the flexible 3D architected body is an exploration device with leg-based locomotion and controllable gait.

11. The soft bodied robotic device of claim 1, wherein the flexible 3D architected body is a cyclic actuator capable of three-dimensional motion.

12. The soft bodied robotic device of claim 1, wherein the motion of the flexible 3D architected body exhibits mechanical metamaterial properties zero Poisson's ratio, negative Poisson's ratio, and unidirectional or bidirectional twisting upon pure compression.

13. The soft bodied robotic device of claim 1, wherein the flexible 3D architected body is fabricated with a method comprising:
   providing a CAD model of an object with a surface;
   performing a tessellation over a volume or a surface of the CAD model;
   generating the soft bodied robotic device by applying automated tessellation algorithms over the volume or surface of the CAD model;
   fabricating a flexible 3D architected body, based on the CAD model tessellation, by 3D printing, molding, or injection molding using a material selected from the group consisting of elastomer, elastomeric composite, metal, polymers, or any combination thereof; and
   programming an elastic properties of the soft bodied robotic device by tuning a direction, rigidity, size, and density of the interconnected beams integrating the 3D architected body.

14. The soft bodied robotic device of claim 1, wherein the flexible 3D architected body exploits mutually exclusive mechanical instabilities to achieve pure compression, unidirectional twisting, and bidirectional twisting.

15. A soft-bodied robotic device comprising a flexible 3D architected body composed of a plurality of interconnected beams, is distributed throughout a volume or only over a surface to provide a substantially hollow structure wherein the 3D architected body is configured to reversibly expand, contract, bend, or twist in a controllable direction when a tension along the interconnected beams lead to coordinated bending and/or buckling triggered by tendon-based actuator(s) capable of applying tension and controlling propagation of elastic instabilities through the interconnected beams to provide motions for the flexible 3D architected body, wherein the motion of the flexible 3D architected body upon actuation is defined by programing an elasticity of the flexible interconnected beams, wherein the soft bodied robotic device is made of a material selected from the group consisting of an elastomer, an elastomeric composite, a metal, a polymer, and a material which is a combination of one or more materials from the said group.

* * * * *